UNITED STATES PATENT OFFICE.

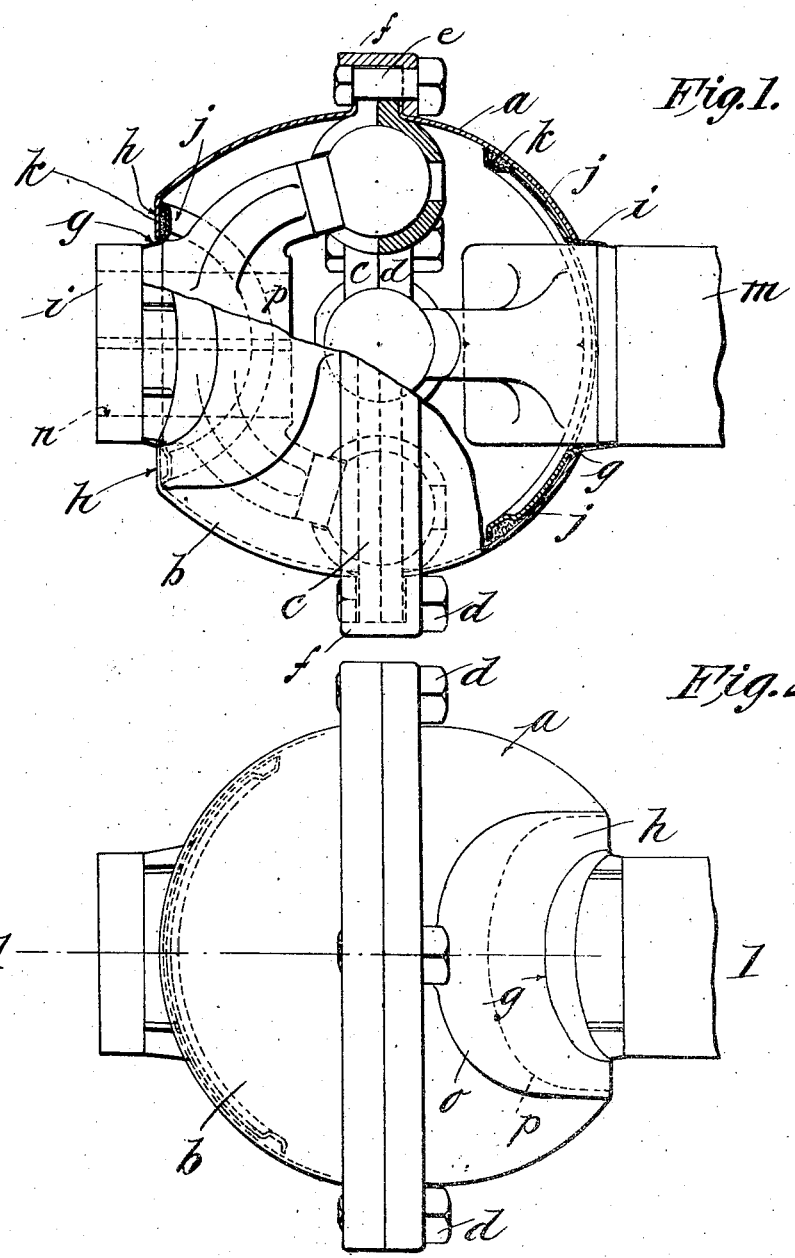

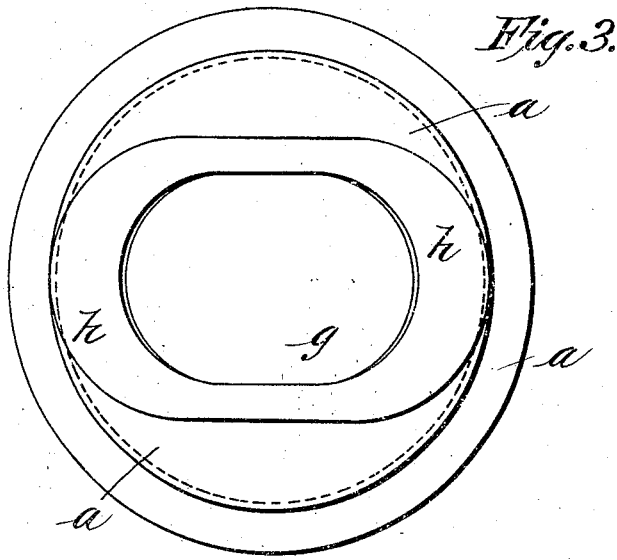
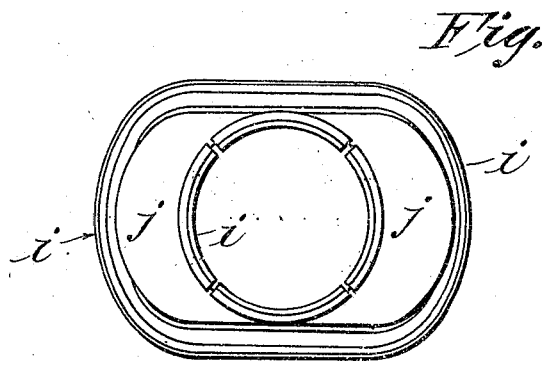
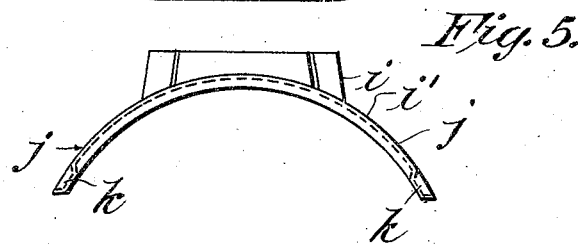

FRED H. BOGART, OF HARTFORD, CONNECTICUT, ASSIGNOR TO HARTFORD AUTOMOBILE PARTS CO., OF HARTFORD, CONNECTICUT.

UNIVERSAL-JOINT CASING.

No. 867,551.

Specification of Letters Patent.

Patented Oct. 1, 1907.

Application filed October 15, 1906. Serial No. 338,886.

*To all whom it may concern:*

Be it known that I, FRED H. BOGART, a citizen of the United States of America, residing at Hartford, in the county of Hartford and State of Connecticut, have invented new and useful Improvements in Universal-Joint Casings, of which the following is a specification.

This invention relates to improvements in universal joints of the kind shown and described in my allowed application under Serial Number 309,339 filed April 2, 1906, and particularly in the construction of a casing for said joint.

Broadly, the invention consists in making the casing proper in two parts from sheet steel stampings, and in providing each part with a cylindrical surface adjacent the opening through which the operative parts of the joint extends, and further in forming the closure piece for the openings with a cylindrically curved surface that corresponds with the curvature of the casing proper. The closure pieces are each provided with a beaded edge for receiving a suitable packing material or gasket; this construction being for the purpose of protecting the joint from dust and retaining the lubricant therein. The two parts of the casing being secured to the bearing rings which carry the spherical ends of the yoke-shaped elements shown in my prior application.

In the drawings forming a part of this application, Figure 1 is a partial sectional view showing portions of the two part casing cut away, and also showing in dotted lines the extent of one of the cylindrical surfaces on the casing. Fig. 2 is a plan view at right angles to the view shown in Fig. 1 and showing the other cylindrical surface at the opposite side of the two part casing, and the first mentioned cylindrical surface in dotted lines. Fig. 3 is a top plan view of one of the casing elements, showing the elongated opening for either the driving or driven element, and the cylindrically curved surface adjacent such opening. Fig. 4 is a plan view of one of the closing pieces for the casing. Fig. 5 is a side elevation of the view shown in Fig. 4 and showing the beaded edge and cylindrically curved surface that closely fits the same shaped surface in the casing elements.

Referring to the drawings in detail *a* designates one of the elements of the casing and *b* designates the other element, these two elements being secured to the bearing rings *c* and *d* of the joint by means of bolts *e* and a clamping ring *f*. Each of the elements *a* and *b* adjacent the openings *g* is provided with a cylindrical curved surface *h* that extends nearly to the median line of the joint as shown in Figs. 2 and 3.

*i* designates the collar portion of the closure piece *i¹* for the opening *g*. This collar portion is preferably circular in shape and is provided with wing portions *j* that are adapted to engage the casing elements *a* and *b* on the inside thereof, as shown in Figs. 1 and 2. The curvature of the portions *j* is the same as the cylindrical portions *h* of the elements *a* and *b*. The portions *j* are provided with a beaded edge *k* for receiving packing material of any suitable kind, as felt, for the purpose of forming a dust and oil tight joint between the two cylindrically curved surfaces *h* and *j*. The collar or ring portion *i* has a tight or sliding fit on the driving and driven parts of the joint, these parts being indicated by the letters *m* and *n*.

The extent of the cylindrical surface on the two portions *a* and *b* of the casing is shown in Fig. 2 by the line *o* and also in Fig. 3, and the extent of the wing portions *j* that engages the cylindrically curved part *h* of the elements *a* and *b* is shown by the dotted line *p* in the Fig. 2 when the collar or ring portion stands in the center. The portions *j* are made long enough so as to permit each of the yoke-shaped pieces of the joint to move through a large arc without uncovering the opening *g*; it being understood that the movements of both of the driving and driven elements *m* and *n* move in the arc of a circle and not in a spherical surface, and therefore the portion *h* of the casing elements *a* and *b* are made cylindrical. The parts are assembled by placing the closure pieces on the yoke-shaped parts of the joint, then the casing elements *a* and *b* are slipped over the driving and driven parts *m* and *n* and in engagement with the wing portions *j*. Clamping rings *f* are next placed in position and the bolts *e* inserted to hold all of the parts together.

Referring particularly to the views shown in Figs. 3, 4 and 5, which plainly indicate the cylindrically shaped surfaces in the casing members *a* and *b*; the closure piece *i¹* extends through the opening *g* while the cylindrical wing portions *j* engage the cylindrical portion *h* of the casing. It will be seen from these figures that the path of travel of the closure piece is always on the cylindrical surface *h* of the casing and the movement is limited by the ends of the elliptical or elongated opening *g* which is sufficiently large to permit any movement of the driving and driven members *m* and *n*. It being of course understood that the casing members *a* and *b* are placed at right angles to each other to correspond with the arrangement of the yoke-shaped members of the joint, as shown in Figs. 1 and *f*.

What I claim is:

1. In a universal joint-casing of the class described, an inclosing casing therefor comprising elements adapted to be secured to the bearing pieces of the joint, and having openings therethrough, there being cylindrically shaped surfaces at opposite sides of the same and located in planes at right angles to each other; said surfaces surrounding the openings thereof, and closure pieces also having cylindrically shaped surfaces and engaging the first mentioned cylindrically shaped surfaces, said closure pieces being detachably secured to the driving and driven parts of the joint.

2. In a joint of the class described, a two-part casing therefor, means for securing the same to the bearing portions of the joint and having cut out portions elongated in shape for receiving the driving and driven elements of the joint, there being cylindrically-shaped surfaces formed in the casing elements about the marginal edges of said openings, closure pieces carried by the driving and driven elements of the joint and having correspondingly shaped surfaces extending away from the openings for engaging said casing elements, there being beaded edges on said closure pieces for receiving packing material, whereby a tight joint is formed between the two said cylindrical surfaces, and whereby the operative elements of the joint always move in planes at right angles to each other, as described.

3. In a joint of the class described, a casing therefor, said casing being made in two parts and having elongated openings in opposite sides thereof, and arranged so that the major axes of the openings are at right angles to each other, the marginal edges of the openings being in a cylindrically curved surface, and closure pieces for said openings each having a collar or ring portion that normally projects through the openings there being cylindrical portions integral with the collar or ring portion and lying within the casing and normally engaging the cylindrical portion of the casing as described.

4. A casing for universal joints a portion of the casing being substantially spherical in shape and another portion cylindrical in shape, and having an elongated opening located within the cylindrical shaped surface, means for closing said opening comprising a collar or ring portion for engaging one of the transmitting members of the joint and also a portion corresponding in shape with the cylindrical portion of the casing, as described.

5. A casing for universal joints made in two parts and attached to the section supporting elements $c$ and $d$ of the joint, a clamping ring $f$, each part of the casing having an elongated opening $g$ provided with a cylindrical curved surface $h$, a closure piece having wing-portions $i$ for closing the elongated opening and carried by the driving and driven elements and engaging the cylindrical surfaces $h$ of the casing whereby the path of movement of the driving and driven shaft sections are in planes at right angles to each other, as described.

FRED H. BOGART.

Witnesses:
H. W. BOWEN,
H. A. CHAPIN.